INVENTOR
George Taylor Stanton
BY
Curtis, Morris + Safford
ATTORNEYS

INVENTOR
George Taylor Stanton
BY
Curtis, Morris & Safford
ATTORNEYS

June 27, 1961 G. T. STANTON 2,990,184

APPARATUS FOR SYNCHRONIZING TRANSDUCER HEAD SCANNING MOTION IN SOUND RECORDING AND REPRODUCING MACHINES

Filed June 18, 1954 3 Sheets-Sheet 3

INVENTOR
George Taylor Stanton
BY
Curtis, Morris & Safford
ATTORNEYS

United States Patent Office 2,990,184

Patented June 27, 1961

2,990,184

APPARATUS FOR SYNCHRONIZING TRANSDUCER HEAD SCANNING MOTION IN SOUND RECORDING AND REPRODUCING MACHINES

George Taylor Stanton, Fairfield, Conn., assignor to Dictaphone Corporation, Bridgeport, Conn., a corporation of New York Filed June 18, 1954, Ser. No. 437,762

7 Claims. (Cl. 274—11)

This invention relates to sound recording or reproducing machines and to methods and apparatus for producing a synchronization of the scanning relationship of the transducer head relative to the sound tracks in machines using sound records of the type which do not have mechanical grooves, for example, such as magnetic belt records, magnetic disk records, or optical photo-electric records.

The invention has particular utility in machines using belt records, as explained below, but is useful wherever there is a problem of maintaining synchronization of a sound head and a groove-less sound track. In sound recording and reproducing machines using the belt-type of record, various possible arrangements may be provided for supporting and driving the record. For example, in one such machine the record is supported in a loop under tension and passed around a pair of individual rollers. In other machines alternative arrangements may be provided, for example, the belt may be supported by a single expandable roller, or, if a long length of record is used, the record may be fed into and out of a storage compartment, with only a part of the record being driven at any one time.

In all of these various types of belt-record machines, the record belt is driven by means of the frictional engagement between the surface of the record and one or more drive rollers or mandrels. It has been found impractical to provide a positive drive relationship between the drive roller and the belt record. The use of sprocket teeth co-operating with sprocket holes in the edges of the belt record, for example, as used with movie film, is impractical because of the excessive wear of the sprocket holes in the record, the weakening of the belt record, and the difficulty of properly loading and unloading such a record in dictating machines. Unlike a movie film in which each individual sprocket hole must engage a sprocket tooth only once during each showing of the film; a sound belt record may be revolved hundreds of times during each usage, for the sound track may spiral around the record this many times, and hence each sprocket hole must engage a sprocket tooth once per revolution of the record. Moreover, in the case of magnetic records, they should be adapted for a considerable amount of reuse, making sprocket holes particularly impractical for magnetic belt records. A frictional drive enables easy loading and unloading of the machine and distributes the driving force over the entire surface of the record, and hence it does not place any undue wear on any portion of the record.

It has been found that with this type of frictional drive there is a tendency for the belt to slip or "creep" relative to the surface of the drive mandrel or roller, and the extent of this slippage depends upon many variable factors such as the humidity, amount of wear present on the roller surface and on the undersurface of the record, etc. Also, this slippage may occur in varying amounts both during recording and reproducing. Moreover, the length of the belt itself is subject to change due to stretching under tension, changes in humidity, manufacturing tolerances and age of the record. These various factors add together in cumulative fashion to disturb the rate of motion of the belt record relative to the motion of the drive roller. Thus, under these various conditions, a single rotation of the drive roller may cause a slightly varying percentage of the length of the belt record to be fed past the sound recording or reproducing head. In other words, under various conditions, a different percentage of revolution of the belt record may be produced by a single rotation of the drive roller. This cumulative error in the record travel causes no immediately apparent trouble during sound recording, except that variations in the spacing of the sound tracks may occur as they are formed on the surface of the belt record.

In mechanical recording systems wherein a stylus physically cuts or embosses a groove or track into the surface of the record, this cumulative error in the position of the belt record causes no difficulty during sound reproducing, because the reproducing head is mounted with some compliance and the stylus is forced by the walls of the groove on the record surface to follow along in it. However, in other systems of recording, such as magnetic or optical systems, there is no groove to maintain the proper relationship between the reproducing unit and the sound track, and so the reproducing unit may easily get out of phase, i.e. lead or lag to one or the other side of the sound tracks. These phasing difficulties are due both to the original variations and error in spacing of the sound tracks as they were recorded and to the errors in motion of the record itself during reproduction. The methods and apparatus of the present invention overcome these difficulties and may advantageously be used either for recording or reproducing, or for both.

In magnetic sound reproducing machines, when the head shifts into an improper lateral position with respect to the sound track from which sound reproduction is taking place, so that the record-engaging face of the head is partly on and partly off to one side of the sound track, the reproduced sound signal becomes weak or "faded," i.e. the head is "partly out of phase" with the sound track. If this condition becomes aggravated so that the face of the head lies mid-way between adjacent tracks, or (depending upon the relative widths of the face of the head and of the space between adjacent sound tracks) simultaneously touches or overlaps the adjacent edges of two sound tracks, substantially no sound or (in the overlapping case) intermingled and confused feeble sounds are produced, i.e. the head is "completely out of phase" with the sound track.

In order to obtain good quality sound reproduction, it is desirable that the face of the reproducing head never deviate in phase more than a fraction of the width of a single sound track. Even for the lowest quality of reproduction this deviation should never exceed more than one-half of the width of a sound track or should not exceed two-thirds of the spacing between tracks, whichever is the lesser distance. That is, the reproducing face of the head should always contact at least one-half of the width of the sound track itself and should not move any closer to the edge of the adjacent track than one-third of the space between adjacent tracks.

It is emphasized, as indicated above, that the effects of the "creep" of the belt record on its drive roller and of changes in the roller or record dimensions are cumulative, and thus after a relatively few rotations of the drive roller, this error may amount to a considerable length of the belt record; and hence may quickly amount to a large fraction of the width of the sound track, for the sound track follows a more-or-less helical path on the surface of the belt record.

For example, assume that humidity and surface conditions of the record and drive mandrel are such that 0.2% slippage is occurring between them and also assume that due to manufacturing tolerances, temperature, humidity and age the record is 0.3% longer than the designed value. Under these conditions, during each revolution of the record, it drops 0.5% behind its required position. This error is cumulative in effect, and by the end of only 100 revolutions of the record, the head will be completely out of phase with the sound tracks. In fact, after only 50 revolutions, the head is engaging less than one-half of the sound track, which is more than the maximum allowable deviation even for low quality sound reproduction.

Other factors also may contribute to this cumulative error. For example, the diameter of the drive mandrel due to tolerances or temperature variations and wear may be slightly less than the designed value, which has the same effect as if the circumference of the record is too large. Moreover, in usual office practice a first machine is used for dictation and a second machine is used for transcription. If the diameters of the drive mandrels in these two machines are different, the phasing problem becomes even more acute.

The methods and apparatus of the present invention provide a synchronization between the motion of the surface of the belt record itself and the scanning motion of the transducer unit over the surface of the record. In the described embodiments of the present invention the scanning mechanism repeatedly passes through cycles including two alternate transverse scanning conditions; the transition from the first condition into the second condition is automatic and depends upon the motion of the record drive mechanism. The return change from the second scanning condition into the first scanning condition is caused solely by the relative position of the record itself, which actuates a triggering mechanism. Thus, at the end of each cycle of operation of the synchronizing method, the record and scanning mechanism are placed in synchronism. With this arrangement the scanning of the transducer unit across the surface of the record is at all times controlled or monitored by the motion of the record itself, and hence the scanning relationship is independent of the amount of slippage which may occur and is independent of any changes in record or roller dimensions, or the like, which may take place.

The first and second scanning conditions may occur once during each revolution of the belt record so that synchronization of the scanning is made once per record revolution. Or they may occur more than once per revolution of the record, or only after predetermined integral numbers of record revolutions, or at random, as will be understood from the detailed description of the various embodiments of my invention disclosed herein. But in every case the scanning motion of the transducer head is controlled or monitored by the motion of the record surface itself and is independent of the various factors discussed above.

In accordance with aspects of this invention the triggering action is caused by a registry point or points which are formed on the belt record.

In accordance with other aspects of the present invention, the first and second scanning conditions may be varied as best suits a particular sound recording and reproducing operation. Thus, the first condition may be a gradual transverse motion of the scanning head and the second condition may be a cessation of the motion, or the first condition may be the absence of any scanning motion, and the second condition may be a slow or rapid transverse motion, or the first and second conditions may include various rates of transverse scanning motion, as explained hereinafter.

It is an advantage of the present invention that the synchronization of the motion of the transducer head with respect to the motion of the record surface is attained simply and positively. Moreover, this synchronization may be attained without the need for alteration of the basic structures used in many conventional belt-record type sound recording or reproducing machines.

These and other objects, aspects, and advantages of the present invention will be in part pointed out and in part apparent from the following description taken in conjunction with the accompanying drawings, in which.

Figures 1, 2, 3:
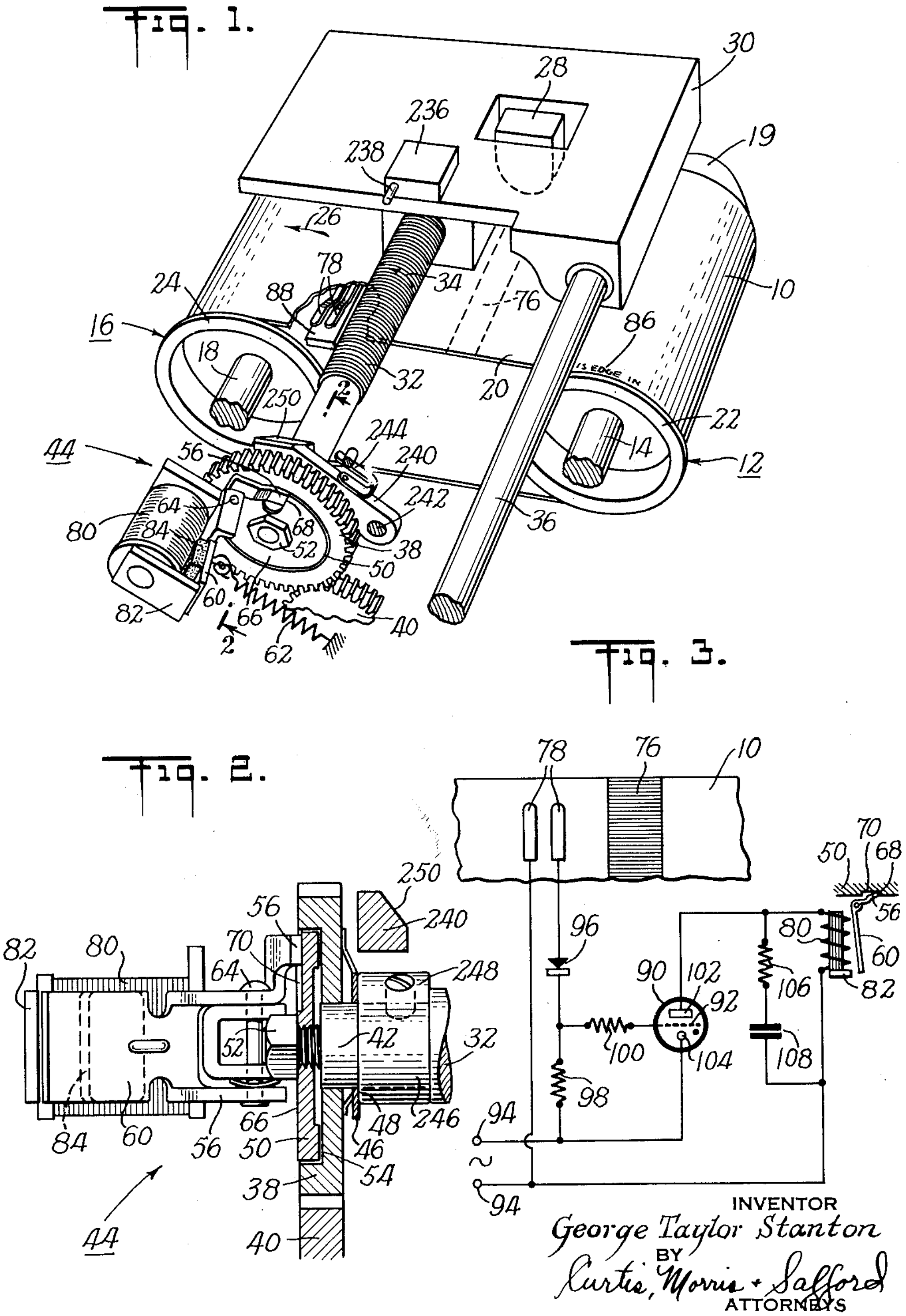
FIGURE 1 is a partial perspective view of a dual mandrel type of magnetic belt-record machine embodying the present invention.
FIGURE 2 is an enlarged cross sectional view taken along the line 2—2 in FIGURE 1 and showing details of a feed screw clutch and electromagnetic control solenoid therefore.
Figure 4:
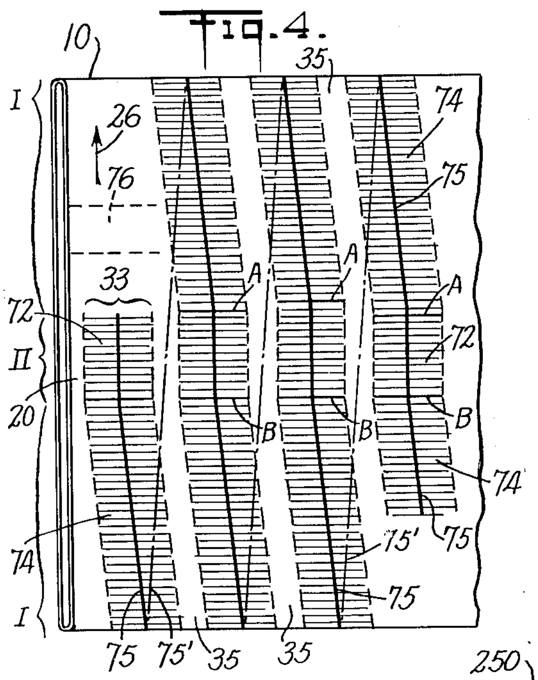
Figures 5, 6, 7:
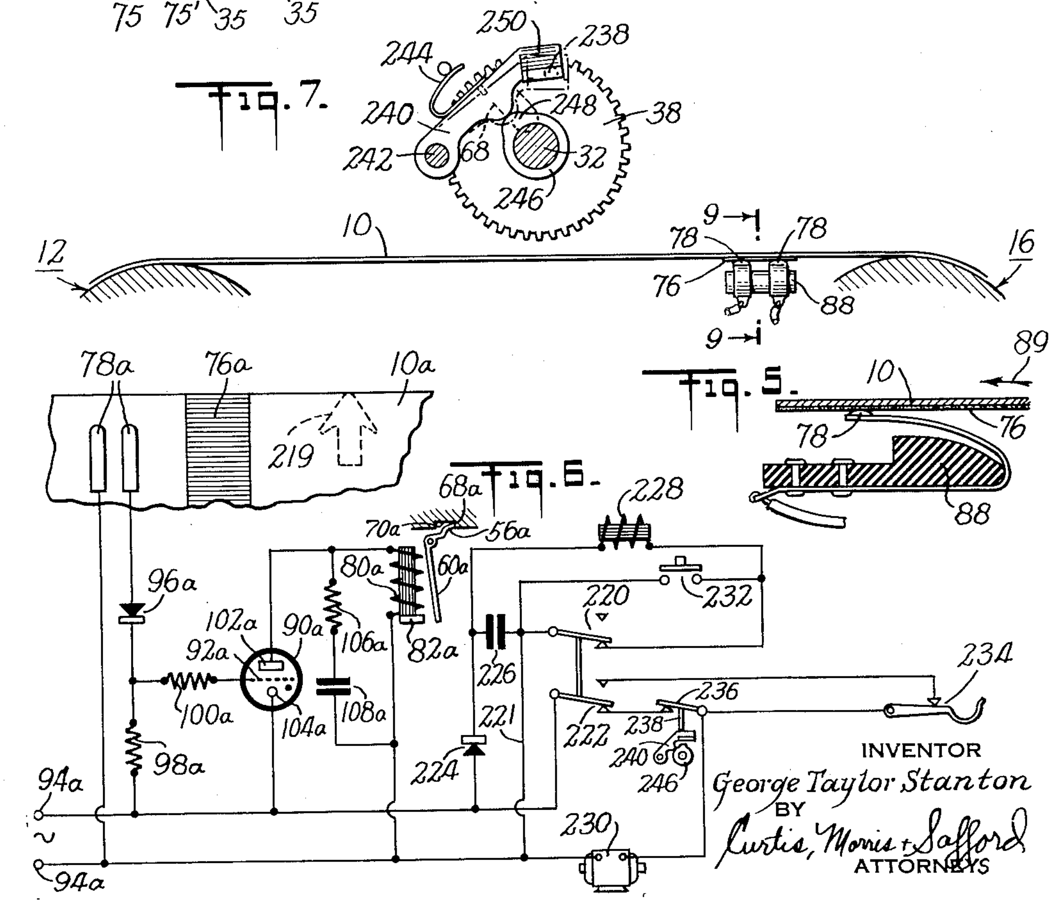
Figure 8:
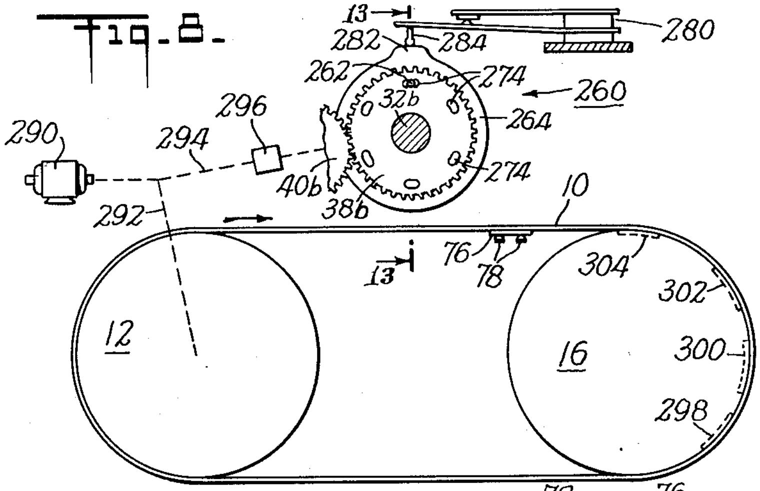
Figure 9:
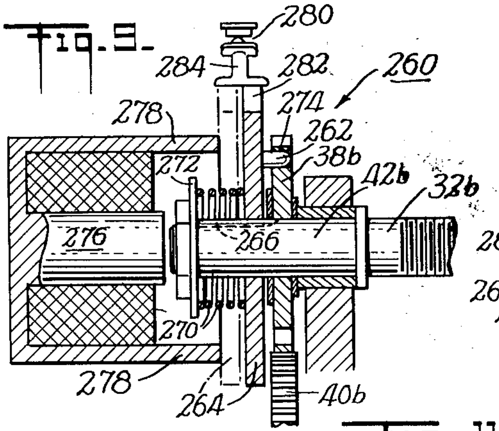
Figure 10:
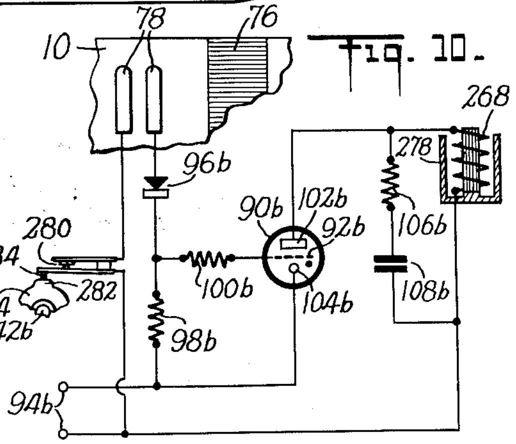
Figure 11:
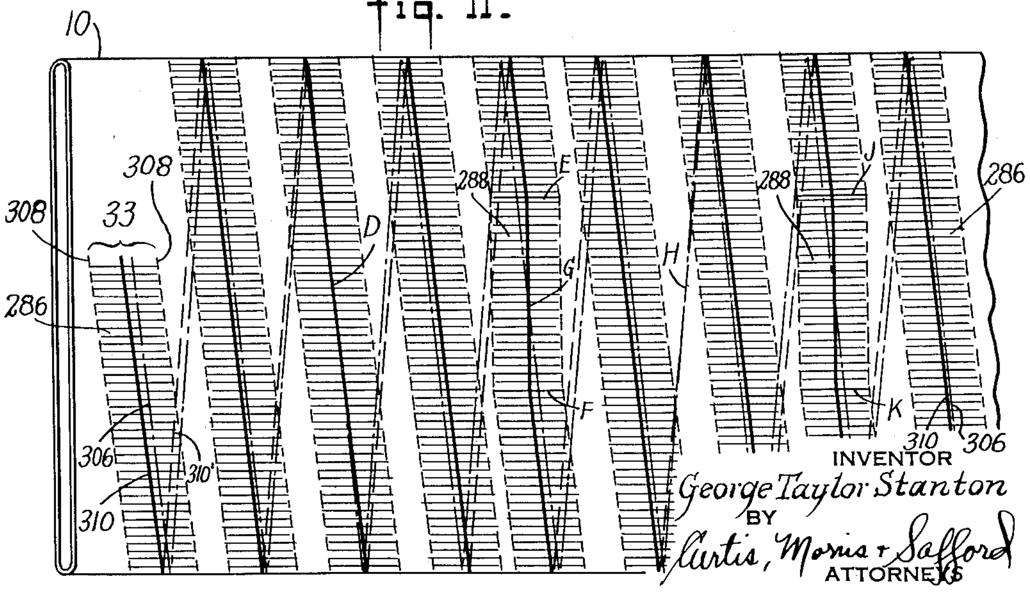

FIGURE 3 schematically shows an electrical circuit for operating the clutch control solenoid;

FIGURE 4 diagrammatically illustrates a belt record with a sound track indicated thereon of the type made by the machine of FIGURE 1, some of the dimensions being greatly distorted for purposes of better illustration and clearer explanation;

FIGURE 5 is an enlarged sectional view through the margin of a record and through an associated electrical contact, taken along the line 9—9 in FIGURE 7;

FIGURE 6 is a schematic circuit diagram of a modified circuit arrangement for use with the machine of FIGURE 1 and corresponding in certain respects to FIGURE 3, but producing an initial automatic phasing of the record and feedscrew;

FIGURE 7 is a cross sectional view of the record 10 and of the feedscrew 32 taken along the line 11—11, in FIGURE 1, looking toward the rear face of the gear 38, but with the indexing band 76 shown bridging the contacts 78;

FIGURES 8, 9, and 10 show another embodiment of the invention in a dual mandrel machine similar to the machine shown in FIGURE 1, FIGURE 8 being a cross sectional view of the record 10 and of the feedscrew 32, FIGURE 9 being an enlarged sectional view of the modified clutch control circuit, and FIGURE 10 showing the electrical control circuit; and FIGURE 11 diagrammatically illustrates a belt record with a partial sound track thereon as made by the method and apparatus of FIGURES 8, 9, and 10, some of the dimensions being greatly distorted for purposes of better illustration and clearer explanation.

Referring to the drawings in greater detail, FIGURE 1 shows portions of the record drive mechanism, feed screw drive mechanism, and the transducer head carriage of a dual mandrel type of machine using a magnetic belt record 10. In removing the record from this machine one mandrel, generally indicated at 12, supported on an axle 14 may be moved inwardly toward the other mandrel 16, supported on an axle 18, so as to reduce tension on the belt to facilitate its loading and unloading. The belt record is loaded by sliding it simultaneously over the rounded ends 19 (only one is shown) of these mandrels until its margin 20 strikes the flanges 22 and 24 on the adjacent ends of the mandrels 12 and 16, respectively, and when the record reaches its fully loaded position against the flanges, as shown, the mandrel 12, which is spring biased outwardly, is released to apply tension to the record.

During sound recording or reproducing, the record 10 is driven along its path around the two mandrels in the direction of the arrow 26 by a suitable drive mechanism including an electric motor, as is known in the art, which operates through an intermediate belt or gear drive mechanism (not shown) to rotate the axle 18 of the drive mandrel 16 in the same direction as the arrow 26. In order to maintain the record margin 20 firmly aligned against the flanges 22 and 24 during recording or reproducing operation, the axle 14 is canted slightly with respect to the axle 18 to provide a slight relative component of motion tending to drive the record continuously toward the flanges by suitable canting mechanism, such as disclosed in U.S. Patent No. 2,371,116 to Yerkovich, issued March 6, 1945. The record is driven by the frictional engagement of its undersurface with the relatively smooth cylindrical surface of the drive mandrel 16 or it may be driven by both mandrels depending upon the machine construction. It moves past the record-engaging pole faces (not shown) of a magnetic recording and/or reproducing head 28 mounted in a carriage 30.

Thus, with this frictional drive the record may slip or "creep" on the surface of the drive mandrel, or when the record becomes stretched as by the factors mentioned above, it tends to revolve past the mandrel 16 at a speed different from the correct speed. Therefore, if the feedscrew 32, which is driven by the same main drive mechanism (not shown) as the mandrel 12, were rotated continuously as in conventional machines the head might soon get out of phase with the sound track, as explained above.

In the methods and apparatus of the present invention this phasing problem is overcome, for the transducer head scanning motion is controlled by the motion of the record, and synchronized therewith. In this method the transverse scanning is continued in a first condition of operation until it is changed into a second condition of operation by the drive mechanism, and it continues in this second condition of operation until triggered back into the first condition of operation by the record belt itself when the belt reaches predetermined positions in its path. This cycle of operation is repetitive, and may repeat itself at fixed intervals or during intervals of variable length, and these two conditions of operation follow each other in succession as the recording or reproducing takes place.

An embodiment of this method of synchronization of the scanning of the head 28 relative to the record 10, will be understood by considering the apparatus shown in FIGURES 1, 2, 3, 4, 5 and 7. In the machine shown in FIGURE 1 during recording the combined revolution of the record 10 and motion of the head 28 produces a continuous magnetic sound track 33 (see FIGURE 4) on the surface of the magnetic belt record 10. In order to prevent the phasing problem discussed above, the head 28 is driven by intermittent rotation of the feedscrew 32. The feedscrew is rotated in the direction of the arrow 34 to slide the carriage along a guide rod 36 in a direction away from the record margin 20, so that the head 28 intermittently recedes from this margin while the record continuously revolves in the direction of the arrow 26. The magnetic sound track 33 is invisible, consisting only of a very thin narrow band (shown diagrammatically enlarged and shaded) of successive areas of varying intensity of magnetization corresponding to the variations of the sound being recorded, with narrow spaces 35, which may be considered "barrier zones," between adjacent loops of the track. This recording operation may be continued until a part or the entire surface of the record is filled with recorded material.

During reproducing, the record is again revolved in the direction of the arrow 26 and the head 28 is started adjacent the leading margin 20 of the record. It is intermittently moved away therefrom by the feedscrew 32. The feedscrew is intermittently rotated by a gear ring 38 engaging a drive gear 40 (partly shown) which is driven by the same driving mechanism as the axle 18. Because it is driven by the same driving mechanism the feedscrew when it rotates, moves at a fixed rate relative to the mandrel 16.

In order to provide intermittent operation of the feedscrew, the ring gear 38 (see also FIGURE 2) is mounted to rotate freely on the reduced end portion 42 of the feedscrew shaft, these parts being included in a feedscrew control clutch unit, generally indicated at 44. A spider spring 46 carried on the reduced shaft portion 42 and thrusting against a shaft shoulder 48 biases ring gear 38 to bear against a clutch disc 50, which is threaded by a left hand thread onto the end of the feedscrew shaft 32 and is held in place by a lock nut 52. Hence, when the drive motor is energized, the driving face 54 of the ring gear 38, bearing against the annular lip on the disc 50, tends to rotate the feedscrew.

In order to allow the record belt 10 to control the condition of operation of the scanning, the clutch unit 44 includes a dog or detent 56 on the end of a bell crank attached to an armature 60. The armature is biased by a spring 62 in a counterclockwise direction around its pivot 64 so as normally to hold the dog 56 against the outer surface 66 of the disc 50, whereby the dog 56 can abut against a stop 68 formed by the edge of a recess 70 in the surface of the clutch disc 50, as shown (see also FIGURE 2). When the detent 56 abuts against the stop 68, the rotation of the feedscrew is prevented, and the driving face 54 of the ring gear 38 slips against the disc 50, thus putting the scanning operation into its second condition. In this second condition of operation, which occurs in region (II) indicated in FIGURE 4, the feedscrew 32 is held stationary by the detent 56, and the record belt 10 continues to revolve. Thus the head 28 follows straight segments 72 of the sound track 33 thereon.

As will be explained later, the record controls the triggering of the scanning from this second condition of operation back into the first condition, which occurs in the remaining region (I) indicated in FIGURE 4. In region (I) the feedscrew is allowed to turn, and the head 28 follows inclined or helical portions 74 of the sound track 33. The return to the second condition of operation is automatically caused by the drive mechanism when the detent 56 abuts against the recess stop 68 after a full rotation of the feedscrew. As these conditions follow in succession, the intermittent helical path having straight segments at intervals as shown in FIGURE 4 is produced.

The helical paths 74, continue around the record 10, as shown by their center line 75. This center line is dotted at 75', which represents the continuation of the helical tracks on the other side of the belt record. The relative dimensions of the record 10 and of the sound track 33 are diagrammatically distorted for purposes of clearly explaining the invention. Thus, for example, the width of the record and the width of the sound track and of the buffer zones 35 between adjacent turns have been shown greatly increased. In a typical application of the invention on a dictating machine using a magnetic record there may be from 25 to 200 loops per inch of width of the record, that is, of the order of magnitude of a hundred lines per inch. The spaces between adjacent lines may be anywhere in the range of 3 times to 1/10 of the width of the track, that is, of the order of magnitude of ½ a track width.

In order to allow the record belt to trigger the scanning from the second into the first condition of operation, a control point or points are placed on the belt. In the embodiment shown, this control point is a small stripe 76 (FIGURES 1, 3 and 4) of electrically conductive paint applied across the underside of the belt 10. This stripe periodically closes an electrical control circuit between a pair of electrical contacts 78 (see also FIGURES 5 and 10).

By closing the circuit between these contacts 78, a solenoid 80 in the clutch unit 44 is energized drawing the armature 60 toward the end 82 of the magnetic core of the solenoid until a silencing felt bumper 84 strikes the solenoid 80. This motion of the armature lifts the dog 56 out of engagement with the recess stop 68, allowing the ring gear 38 to start turning the feed screw, thus commencing the first scanning condition. Soon after the feedscrew starts turning, the armature is released so that the dog 56 can slide along the face of the disc 50 ready to drop into the recess 70, once again to throw the scanning into its second condition of operation in which the feedscrew is held stationary.

The control point or points used on the belt may be in the form of a notch or hole in the belt used with a pair of opposing contacts, allowing them to close against each other, or allowing one of them to contact the surface of a metal anvil to complete a circuit, or the control point may be a spot of colored paint to trigger a photoelectric cell, or a magnetically recorded tone signal. However, I have found the conductive stripe 76 to be satisfactory and to lend itself to simplified circuit arrangements. The record belt 10 may be made from plastic which is extruded as a long cylinder and may conveniently have the paint stripe 76 continuously applied on the inside during this extrusion, the individual belt records being subsequently cut from the extruded cylinder.

Preferably, the record belt 10 and all other record belts for the dual mandrel machine contain an indication to the user that one edge is to be used as the leading edge to be inserted into the machine first. This indication may comprise a marginally printed indication 86 such as an arrow or "This edge in." on the left margin 20 of the record. In normal usage, the machine is loaded with this indication 86 toward the flanges 22 and 24.

The stripe extending clear across the inside surface of the record allows for an improper loading operation, which may occur through haste or inadvertence, in which the wrong edge of the record is inserted first. When only a spot or notch is used on the margin 20, a spot or notch (not shown) corresponding in position to this first spot or notch, is applied to the opposite margin so that the machine will operate even with the record reversed.

The number of control points 76 which are used depends upon the chosen value of the "predetermined" amount of belt travel which occurs during the first and second transverse scanning conditions, i.e. upon the number of triggering operations per record revolution (or upon the number of record revolutions for each triggering operation).

As discussed above, the "predetermined" amount of belt travel may be one complete record revolution, in which case the first and second scanning conditions each occur once per record revolution. Or the predetermined amount may be less than or more than one record revolution or may be a random amount, as explained hereinafter. As explained above, the first condition of operation (I) continues until the drive mechanism automatically places the scanning into its second condition (II). This first condition (I) continues for a first portion of this "predetermined" amount of record travel, and the second condition continues for the remaining portion of this "predetermined" amount of record travel. The triggering action only occurs once at the end of the "predetermined" amount of record travel. Thus, for example, if the "predetermined" amount of record revolution is chosen as one full revolution of the record, then the first condition (I) of operation may be chosen to continue for some portion, for example, such as approximately 95% of the full revolution, and the second condition (II) then continues for the remaining 5% of the revolution, similar to the arrangement shown in FIGURE 4.

If the "predetermined" amount of revolution of the record is chosen as one-half of a full revolution, then the first condition of operation may be chosen to continue for some portion of that one-half, and the second condition will continue for the remaining portion of that one-half. It is important to understand that the "predetermined" amount may be a full revolution, a fraction of a full revolution, or more than a full revolution or a random amount of revolutions of the record and the two transverse scanning conditions of operation (I) and (II) continue in succession for "portions" of the record travel whose total equals this "predetermined" amount.

One control point is used on the belt where the "predetermined" amount equals a full revolution, as illustrated in FIGURE 1. Two equally-spaced control points are used where the triggering occurs after every one-half of a revolution, three for a third of a revolution, and so forth.

Where the "predetermined" amount equals more than a single revolution of the belt record, one or more control points are used depending upon the feedscrew ratio, described hereinafter.

As shown enlarged in FIGURE 5, the contacts 78 are mounted upon an insulating block 88 and are bent back over their terminal ends on the bottom of the block and inclined so that the margin 20 of the record when inserted as shown by the arrow 89 can slide up over them without catching. Their bend provides a spring action so they bear up against the underside of the record when it is fully inserted so as to make good contact with the control point conductive stripe 76, completing the solenoid control circuit shown in FIGURE 3.

This circuit includes a gas-filled thyratron 90 of the cold cathode type, such as a 5823 tube, including a control grid 92 to which a positive voltage must be applied to fire the tube. The circuit is energized from a suitable sixty cycle A.C. source through the supply terminals 94.

When the contacts 78 are bridged by the conductive stripe 76, the A.C. supply voltage is rectified by the selenium rectifier 96 and is applied across the grid return resistor 98 and through the current-limiting resistor 100 to fire the tube, allowing current to flow from its plate 102 to the cathode 104. A surge of current flows through the solenoid coil 80, pulling the dog 56 out of engagement with the recess stop 68. A resistor 106 and condenser 108 are added in series across the solenoid in order to improve its operation.

Since A.C. is used to energize the tube 90, it automatically is extinguished when the plate voltage swings negative during alternate half-cycles and is re-fired during the next half-cycle only if the contacts are still bridged by the conductive mark 76. I have found that it is preferable to have the control strip 76 sufficiently wide to bridge the contacts 78 for at least $\frac{1}{10}$ second to insure that the disk 50 begins to rotate a sufficient amount so that the stop 68 will clear the dog 56 before the armature 60 is released.

An advantage of using the cold cathode thyratron 90 is its instantaneous readiness for use, no delay for warm up. Also, such tubes are readily triggered in spite of any high contact resistance which may occur in the grid circuit, thus allowing the use of conductive paint and light spring pressure of the contacts 78 so that the conductive paint is not unduly worn.

In the dual mandrel type of machine illustrated, the feedscrew 32 is driven at a rate which is sufficiently fast to insure that the first condition of operation (I) always is completed and the dog 56 has been allowed to hold the feedscrew in the second condition (II) for at least some period of time before the belt record has advanced its "predetermined" amount e.g. in the embodiment just described, before one full revolution of the record has taken place. This fast feed ratio is necessary to accommodate all ranges of possible slippage and tolerance variations, including short records and oversize mandrels, which result in a higher-than-average rate of record travel. In a particular embodiment of this invention the feed ratio between the feedscrew and drive mandrel are such that on the average the feedscrew makes one complete revolution, condition (I), while the record makes about 97% of a revolution. Variations in the amount of record travel are accommodated by the length of the second condition of operation (II), i.e. by the relative lengths of the straight segments 72 between straight line starting points A and finishing points B. These straight segments 72 are of indeterminate length depending upon how much creepage and effects from relative dimensions of record mandrels has occurred during the preceding condition (I). These straight segments continue until the next control point is reached on the record. Hence, as shown in FIGURE 4, the ends B of the straight line segments 72 all occur at the same longitudinal place on the record determined by the position of the conductive stripe 76, but the positions at the beginnings A of the straight segments 72 depend upon all of the variable factors described above and hence may occur at different longitudinal positions on the belt record at each revolution, as indicated in FIGURE 4.

Since the scanning operation is repeatedly synchronized with the motion of the record after predetermined amounts of record travel, it is clear that the cumulative errors discussed above are eliminated. The scanning is placed in synchronism with the record each time a control point on the record triggers the scanning mechanism.

In a particular embodiment of this invention utilizing the dual mandrel type of record drive arrangement, as shown in FIGURE 1, the following particular dimensions and speeds were successfully used. The record was a paper web material coated on its outer surface with a layer of magnetic material, and it was 3½ inches wide and 12 inches around. The mandrels were each 1.75 inches in diameter, and the drive mandrel was rotated at a speed of approximately 36 r.p.m., to provide a record speed of 3 inches per second or 15 feet per minute, being equivalent to an average record speed of 15 r.p.m. The feedscrew was rotated at slightly more than 15 r.p.m. and had a pitch of 52 threads per inch, thus providing 52 sound tracks per inch on the surface of the record, giving a sound track pitch of .01923 inch per record revolution and giving a total recording time of 12 minutes. On an average, as mentioned above, the head was scanned at its first rate during a first portion of a full revolution amounting to approximately 97% and on the average remained stationary during the remaining 3%. The sound track was .014 inch in width and the average widths of the intermediate buffer zones 35 was .00523 inch, being a little more than ⅓ of the track width.

FIGURES 6 and 7 considered with FIGURES 4 and 5 show a modified automatic record phasing arrangement corresponding in certain respects to the arrangement of FIGURES 1, 2, 3, 4 and 5. Components in the circuit of FIGURE 6 performing corresponding functions to those in the circuit of FIGURE 3 are marked with the same reference numerals, followed by a distinguishing suffix. The purpose of this modified arrangement is automatically to return or index the feedscrew 32 (FIGURE 7) whenever a record 10 is unloaded from the machine, to an initial position corresponding to the point of transition from the first to the second conditions of operation, i.e. to the position wherein the dog **56*a* (FIGURE 6) drops into the recess and abuts against the stop 68*a*. Thus, when a record with previously recorded material is again loaded for reproduction, it is automatically in phase from the very initial part of the sound track. Also, advantageously a blank record has its sound track start without an unduly long straight initial portion, such as portion 72** shown in FIGURE 4.

With the circuit of FIGURE 3, the feedscrew 32 is left in a random position following unloading of a record, and hence when a record with recorded material thereon or a blank record is loaded into it, the head may be out of phase with the desired track for some random amount of the first record revolution, i.e. until the contacts 78 have been bridged and have triggered the scanning operation for the first time. This unphased initial period may amount to almost a full revolution of the record, requiring 4 seconds in the particular dual mandrel machine described above, but the modified circuit of FIGURE 6 does away with this initial random period.

In the circuit of FIGURE 6, assume that the operator has finished recording and desires to eject a record. The first step is to move the carriage 30 to its initial position near the flanges 22 and 24 as required by an interlock arrangement, as is known in the art, which prevents ejection of the record until the carriage is in this position. Assuming that the dog **56*a* does not happen to be in the recess 70*a*, which is the desired initial position of the feedscrew, then when the record 10*a* is unloaded by using a record ejection lever mechanism on the front of the machine (not shown), the idler mandrel 12 is moved inwardly, as described above, and a lever (not shown) on its shaft 14 operates a first and second single pole double throw switch 220 and 222, respectively, shown ganged together, to move the switches into their lower positions, as shown. The first switch 220 completes a circuit from one of the power terminals 94*a* through a rectifier 224, across a filter condenser 226, through a drive clutch control solenoid 228, and through switch 220 and lead 221 to the other power terminal. This completed circuit energizes the clutch solenoid in order to provide a drive connection from the main drive motor 230 to the drive gear 40 (FIGURE 1). The stop-start operation of the machine shown in FIGURE 1 is controlled by means of the clutch solenoid 228, as is known in the art, which must be energized to provide a drive. During normal use, the switch 220 is open, and a hand or foot switch 232 is used to control the drive solenoid 228**.

The switch 222 serves to by-pass a cradle switch 234, which normally de-energizes the motor 230 whenever the hand microphone unit (not shown) is hung up, as known in the art. This switch 222 completes a circuit to an indexing switch 236 (see also FIGURE 1) carried on the carriage 30, and which is now adjacent the ring gear 38 because during the first step of record ejection the carriage was manually shifted there. Thus, the push button 238 of the index switch lies in the path of an index switch actuator arm 240 (see FIGURE 7) which has an end secured to a pivot 242 and is biased by a spring 244 to ride against a cam 246 located on the feedscrew 32 closely adjacent the ring gear 38. An elevation 248 on the cam 246 is oriented with respect to the recess stop 68, shown in phantom, so that the actuator arm 240 is raised at the same time as the dog 56 drops into the recess stop 68. A sloping surface 250 on the free end of the arm 240 pushes the button 238 inwardly as the arm is raised, thus opening the switch 236 and stopping all further action leaving the feedscrew in its desired initial position with the dog 56 in the recess. Therefore, the feedscrew is always left in the same position after record ejection, regardless of whether the hand microphone was hung up immediately following record ejection or whether the manual control switch 232 was released too soon.

An advantage of this arrangement is that during normal operation the carriage and index switch 236 are spaced away from the arm 240 and no operation of the switch occurs, with rotation of the feedscrew, thus greatly reducing wear.

When a machine is equipped with the modification of the circuit shown in FIGURE 6, it is preferable that the user always insert the record belt **10*a* in the same relative position so that the sound tracks start initially in proper orientation with respect to the feedscrew and head, i.e. start in phase. An arrow 219 or some indication 86 (see FIGURE 1), such as a trade-mark is placed on the top side of the leading margin of the record. This mark serves two functions. It tells the user which edge is to be inserted first, or last (as the case may be) and allows the user to align this mark on the record with a fixed mark or position on the frame of the machine so that every record always has substantially the same initial position and the feedscrew has the same initial position. The relative orientations of the control point 76*a* and the loading indication 219 are such that when the machine is initially started following loading, the record will travel approximately only 2 or 3 inches before the point 76*a*** reaches the firing contacts. This 2 or 3 inches provides sufficient latitude in positioning the record, so that the loading position of the record is not very critical.

With this arrangement, since the head is always started in the same initial position, and since the belt record is always started in the same position, the head is in phase from the first instant of operation.

In the transcribing machine, the relative initial position of the head is adjusted at the factory so that the record must make at least one full revolution before the beginning of the sound tracks are reached, and thus the head always starts reproducing in phase with the sound track even though the transcribing machine omits the initial indexing arrangement shown in FIGURES 1, 6 and 7.

Considering again briefly the first embodiment described, it will be understood that the switch 236, arm 240 and cam 246 would be omitted from the machine in the first embodiment, these being used in conjunction with the circuit of FIGURE 6 to produce indexing of the feedscrew always to the same initial position, each time a record is loaded into the machine.

Another embodiment of my invention, in which the "predetermined" amount of record travel is random and normally amounts to more than a full record revolution, will be understood by considering FIGURES 8, 9, 10, and 11 in conjunction with FIGURE 1. This embodiment uses the same methods as the other embodiment, but it is explained last because the concepts involved are somewhat more difficult to understand. Thus, the preceding explanation serves as a foundation for the explanation of this embodiment. This embodiment is preferable for certain applications because, on the average, the triggering action occurs only once for each three or four revolutions of the record, resulting in longer life of the operating parts. The triggering may occur more often where the cumulative error is abnormally large, as might result from the accidental presence of a lubricating agent on the surface of the drive roller, e.g. wax or graphite particles, or where the record has stretched.

In FIGURES 9 and 10 elements performing functions corresponding to those of elements in other figures have the same reference numeral followed by an appropriate suffix.

In this embodiment a clutch control unit 260, FIGURE 9, is used in order periodically to interrupt the drive to the feedscrew. The drive can be traced from the drive gear **40*b* to a ring gear 38*b* which rotates on an end portion 42*b* of the feed screw 32*b* and thence through a clutch pin 262 projecting from a face of a clutch disk 264 which is splined at 266 to the feedscrew end 42*b*. When a clutch solenoid 268 is de-energized, a compression spring 270 thrusting against a washer 272 fastened to the feedscrew end, biases the clutch disk toward the right so that pin 262 engages the side of ring gear 38*b*. This pin then enters whichever one of the oblong holes 274 (FIGURE 8) in ring gear 38*b*** with which it coincides, completing the drive linkage.

The solenoid 268 is advantageously arranged to have a central pole 276 juxtaposed with the end of the feedscrew shaft and an annular pole 278 near the side of the clutch disk 264. Thus, the feedscrew end **42*b* acts as a portion of the magnetic circuit to increase the attraction between the annular pole 278 and the clutch disk 264**.

Energization of the solenoid 268 pulls the disk 264 to the left, to the phantom-line position shown in FIGURE 9, withdrawing the pin 262 from the hole 274 with which it was engaged, breaking the drive to the feed screw and allowing it to stop.

The circuit of FIGURE 10 is used to control the energization of the solenoid 268, and includes a pair of triggering contacts 78 riding against the undersurface of the record 10 and a normally-open, cam-actuated switch 280. In order to fire thyratron tube **90*b* to energize the solenoid 268, the contacts 78 must be bridged by the conductive index point 76 on the record while the switch 280 is momentarily held closed by a raised cam 282 on the periphery of the clutch disk 264, which acts through a cam-follower 284**.

Thus, during operation the record is revolved and the feedscrew is rotated, producing a sound track on record 10 having an initial helical path portion 286 (see FIGURE 11) during a first condition of operation, but whenever the record has drifted back relative to the feedscrew sufficiently far for a coincidence to occur in the bridging of contacts 78 and in the closure of switch 280, then the machine is triggered into its second condition of operation in which the feedscrew is stationary. The solenoid 268 is energized, momentarily pulling pin 262 from one of the holes in ring gear **38*b*, stopping the feedscrew and allowing gear 38*b* to continue rotating freely on shaft 42*b*. During this second condition a straight portion 288 of the sound track is formed, for the record continues revolving while the feedscrew is at rest. As soon as the conductive mark 76 has moved beyond a position to bridge the contacts 78, the firing circuit to the control grid 92*b* is broken, and the tube 90*b* ceases to conduct, de-energizing the solenoid 268. Clutch disk 264 is then moved by spring 270 back to the right, and when ring gear 38*b* has been rotated an amount determined by the spacing of the holes 274, which here is approximately 60°, the pin 262 slides into the next hole 274 and the machine is again in its first scanning condition, forming the next helical portion 286** of the sound track. This cycle repeats itself, but the length of each cycle of operation is a random number of integral record revolutions.

In FIGURE 8, as shown, the pin 262 has just slipped into a hole 274, indicating that the machine has just completed its second condition of operation, in which (while the feedscrew was stationary) the record has advanced an amount corresponding to the amount it normally advances during 60° of feedscrew rotation, i.e. about ⅙ or 17% of a record revolution. Thus, during this approximate 17% of a record revolution, the control point of conductive paint 76 has moved past contacts 78 to some position such as shown in phantom at 298 before the feedscrew again begins turning. During the next rotation of the clutch disk 264 and of the feedscrew, the record does not quite complete a full revolution and so the control point is at position 300 when the cam 282 again raises its follower. The reason that the record drops behind is twofold: first because the many factors which are discussed above tend to cause the record to slip or drift so as to revolve slower than would be expected from the surface speed of the drive mandrel, and second because of the slightly increased feedscrew speed, discussed below. During successive rotations of the feedscrew the control point 76 occupies positions such as indicated in phantom at 302, 304 and when it has dropped back again to the firing contacts 78, the tube **90*b*** is again fired.

As shown diagrammatically in FIGURE 8, the main drive motor 290 drives the mandrel 12 through a coupling arrangement 292 and also drives the drive gear **40*b* through a coupling arrangement 294, which may include a feedscrew speed regulation unit such as a gear box 296**. In this machine the feedscrew is arranged, when it turns, to turn at a slightly increased speed. Thus, for example, in this machine where the record is revolving at 15 r.p.m. the feedscrew, when it rotates, is rotated at a speed in the range from 2% to 20% faster than would be used in a similar type of machine with the same sound track dimensions and space between adjacent tracks. In this machine I prefer to run the feedscrew at a rate of 16 or 17 r.p.m. instead of the usual 15 r.p.m., e.g. about 6% or 7% faster. The feedscrew is run at this slightly faster rate for two reasons: first, so that on the cumulative average, including those periods during the second conditions of operation when it is stationary, it is making about the same number of rotations per record as in a conventional machine; so that the same total number of revolutions of sound track are obtained. Second, the feedscrew must be sufficiently fast to accommodate any unusually fast record, i.e. as with an oversized mandrel and an undersized belt. If the record goes faster than average, the result is that the first conditions of operation include more revolutions of record.

In the diagrammatic representation of a record shown in FIGURE 11, the heavy dash and dot line 306 represents a continuous helix. This is the theoretical centerline of a sound track which would result if the record were used on a machine having a feedscrew speed such as 15 r.p.m. and assuming that the record were driven at a steady 15 r.p.m. with a pitch of 52 lines per inch. The actual sound track is shown as having a width between its side edges 308 of about .014 inch with a space between adjacent tracks in the range of about .002–.008 inch, the average being .00523 inch. On the upper face of the record, as seen in the drawing, the centerline of the actual sound track is shown as a full line 310 midway between track edges 308. On the reverse face of the record, for the sake of simplicity, only the actual centerline, 310' (shown dashed) and the theoretical helix 306 are shown.

Some of the many results of the operation of this random length periodic phasing system can be seen by comparing the centerline 310 of an actual sound track with the theoretical helix 306. The centerline 310 begins to the left of the theoretical helix 306 as seen at the left edge of record 10. During the first two revolutions of the record the actual centerline gains on the theoretical helix, until at point D centerline 310 moves ahead, due to the slightly increased feedscrew speed discussed above. If the record were slipping badly, the centerline 310 would cross helix 306 sooner than two revolutions; if the record were faster, due to the factors discussed above, then centerline 310 might not cross the helix 306 until several record revolutions had occurred.

For approximately two revolutions more (making a total of about four revolutions for condition I during this cycle) centerline 310 progresses steadily ahead of helix 306. At E condition II begins, and the straight track portion 288 is formed, lasting for about ⅛ of a revolution. At F the track again begins as a helix, and the machine is again in condition I. During the straight track portion between transition regions E and F, the centerline 310 drops behind the true helix 306, which crosses the centerline at G.

For purposes of better explanation it is assumed that during this second cycle of operations beginning at area F that the record 10 is beginning to "slip" somewhat more than during the first cycle. Thus, from region F the actual centerline 310 begins to overtake the helix 306 at a faster rate than during the first cycle. At point H at the completion of about one and a half revolutions, centerline 310 crosses helix line 306. In another approximate one and a half record revolutions, at position J the machine is again triggered into its second condition of operation. Once again, the actual centerline 310 of the sound track drops behind the helical line 306. At position K the machine again returns to its condition I and helical scanning occurs, and so forth during the operation.

Reviewing the first two cycles of operation, it is seen that the record revolved four times during the first cycle and three times during the second cycle. That is, the "predetermined" amount of record revolution is random. Also, it is seen that condition II is always about the same amount of record revolution, because it occurs while the clutch plate is revolving the distance between two holes 274. Variations in the amount of record which pass the head while the machine is in condition II may occur, but they are slight since condition II only takes about ⅛ of a record revolution, and the amount of variation in slippage which can occur and accumulate during this small fraction of a record revolution is small.

Condition I occupies the balance of each cycle. Each cycle is very nearly an integral number of record revolutions for they all are initiated by the control point 76 on the record, the random number of record revolutions being controlled by the requirement that cam switch 280 must be closed at the same time that stripe 76 is bridging the contacts 78.

The cam 282 and the stripe 76 both have a considerable width so that the exact position (such as position E) at which the machine is triggered from condition I to condition II may vary slightly from cycle to cycle.

In order to prevent the machine from missing the initiation of any cycle, the effective sum of the widths of the cam 282 and the width of the stripe 76 must be sufficiently great that even a record with a large "slip" cannot drop backward during successive cycles so as to fail to trigger the tube **90*b***.

It is possible to have more than one control point 76 on the record. For example, two evenly spaced conductive paint stripes may be used, in which case the "predetermined" amount of record revolution may be an integral number of revolutions or a number of half revolutions. Three evenly spaced conductive paint stripes would give as the "predetermined amount" combinations of multiples of thirds of a revolution.

The result of any of these random phasing systems, as described above, is that when the record is slower than average, the tube **90*b*** fires more often and vice versa when the record is faster than average. Thus, the centerline of the sound track is maintained at all times within 10% or at the most 20% of its own width of a true helix over the entire width of the record.

Since the recorded track is automatically maintained on the average as a true helix over the entire record surface, the reproducing problem is greatly simplified. Thus, either of two kinds of reproducing or transcribing machines may be used. A machine without automatic phasing control may be used, in which case the reproducing head will follow a continuous helical path whose pitch may vary more or less from the true helix due to slippage, and the person operating the transcribing machine will have to phase it manually from time to time. The amount of phasing required is considerably less than that which would be required if the sound track were not maintained as an average true helix.

Preferably the reproducing machine incorporates automatic phasing also. This might be of the fixed "predetermined amount" type or of the random "predetermined amount" type.

In the latter case the head is re-phased at random and caused to average the same true helix 306. The reproducing head also may deviate 10% or 20% from the true helix 306, but never more. Thus, the maximum possible deviation of the reproducing head from the track can never be more than somewhat less than the sum of the maximum recording and reproducing machine deviations, i.e. less than 40% of the width of the track itself. This large deviation would happen only if the triggering of the phasing of the reproducer were occurring at other places on the record from those at which this triggering had occurred in the recorder.

Thus, with my invention, a random phasing action can also produce correct registry between the sound track and the reproducing head to provide good sound reproducing quality.

The advantages of this latter system are that the triggering takes place less often, thus prolonging the life of the operating parts. Moreover, if for any reason the phasing system should fail, the result is merely to produce a continuous helix, so that the material being dictated would be recorded and not lost by having the head repeatedly retrace a circular path at the same spot on the record.

Thus, it will be seen that the methods and apparatus of this invention are well adapted to carry out the ends and objects hereinbefore set forth. Two embodiments of the invention have been described, and it is to be understood that they can be modified so as to best suit the needs or particular uses. It is to be understood that certain features of the invention can at times be used to advantage without a corresponding use of other features and, therefore, that the examples set forth above are for the purpose of teaching those familiar with this art the principles of the present invention and how to apply them for their particular uses, and they are not intended to be a definition of its scope or an exhaustive analysis of all the possible forms or uses of this invention.

I claim:

1. In a record machine in which a smooth surface record is moved a plurality of times past a record head to trace out a plurality of spaced side by side signal tracks, means for synchronizing the movement of said record relative to said record head, said means including means for feeding said record head substantially continuously and at a substantially uniform rate across said record from one signal track to the next, a synchronizing mark carried on said record, means for recognizing said mark and adapted to change for a short time the rate of feed produced by said means for feeding, and means operable in conjunction with said means for recognizing to permit or enable it to act only when said record head and said record have fallen out of synchronism by a predetermined amount.

2. In a machine for recording and reproducing sound and the like, an endless belt record carrying at least one index mark and adapted to have a plurality of closely spaced turns of a generally helical signal track laid down upon it, drive means to rotate said record longitudinally at a constant speed, a record-reproduce head, feedscrew means to move said head transverse to said record, sensing means to detect each passing of said index mark past a fixed point, control means actuatable by said sensing means in accordance with the passing of said index mark to control a portion of said feedscrew means in order to change the rate of transverse movement of said head, switch means controlled in conjunction with the movement of said feedscrew means to enable said sensing means to actuate said control means only when said head and the track on said record are a predetermined amount out of register with each other, and index means controlled by said feedscrew means to disconnect said drive means only when said feedscrew means and said index mark occupy predetermined relative positions whereby said machine when stopped is automatically left standing in an indexed position.

3. A groove-less recording and playback system of the character described comprising a wide, short endless belt record on which closely spaced turns of a generally helical signal track are to be recorded, a frame carrying a drive mandrel and a support mandrel between and around which said record is stretched, a reproduce head, a feed screw having a constant pitch and adapted to move said head slowly transversely across the record while it rotates longitudinally past said head, a motor to rotate said drive mandrel at a constant speed, clutch means to connect said feed screw to said motor to drive said head across said record, index means carried by said record, first means on said frame operated periodically by rotation of said feed screw, and second means on said frame responsive to passage of said index means, said first and second means acting together at intervals on said clutch means to disengage it for a brief instant while said drive mandrel rotates a short distance.

4. The structure as in claim 3 wherein said first means includes a mechanical detent which periodically causes said clutch means to slip, and said second means includes a switch connected to an electromagnet to cause said clutch to re-engage, said feed screw being normally rotated at a speed slightly faster than necessary for said head to move from one track to the next in the time necessary for the record to complete a single revolution.

5. The structure as in claim 4 wherein said first means includes a first switch and said second means includes a second switch, said switches being connected in series and when both closed at the same instant acting to disengage said clutch means to permit said feed screw to slip a small given amount whereby said head is synchronized with said record as required.

6. In the art of recording and reproducing signals along a generally helical track having closely spaced turns on a short belt record, apparatus for following within operating limits with a scanning pickup the actual signal track on the belt record without using the signal track itself to keep the pickup within said operating limits, said apparatus comprising a recording head, mandrel means for supporting and rotating a short belt record past said head, means for indexing the record relative to the head prior to recording, means for driving said head along a generally but not exactly helical track by moving the head slowly transverse to the record while it rotates past the head, means at repeated short intervals for briefly changing the transverse movement of the head while the record continues to rotate, means including a playback head for thereafter playing back the record after indexing it relative to the playback head in exactly the same position as with recording, means for driving the playback head generally at the same speed slowly transverse to the record while it rotates past the head, and means at repeated short intervals for briefly changing the transverse movement of the playback head while the record continues to rotate, whereby even though the length of the belt record may change slightly in the time between recording and reproducing, or even though the belt record may slip slightly on said mandrel means during either operation, said playback head will always follow within operating limits of said signal track.

7. An improved apparatus for automatically controlling the unidirectional relatively slow lateral feed of a transducer head of a sound recording and/or reproducing machine of the type in which a magnetizable or light-sensitive or optically scannable short belt record is frictionally driven longitudinally past the transducer head at a uniform speed, characterized in that the head is fed across the record at a given speed slightly different from that required for the head to follow a finely-wound helical reference track on said record, whereby said head lags or leads said reference track, and said given speed is changed for short time intervals while the record continues to move past the head, the speed change being in a sense to effect a cross-over of said reference track by said head at the expiration of each of said intervals of changed lateral feed speed, said head approximately following within a predetermined limit of sidewise displacement said reference track.

References Cited in the file of this patent

UNITED STATES PATENTS

| | | |
|---|---|---|
| 2,223,723 | Fox | Dec. 3, 1940 |
| 2,270,832 | Dunning | Jan. 20, 1942 |
| 2,550,803 | Goddard | May 1, 1951 |
| 2,581,765 | Mann | Jan. 8, 1952 |
| 2,611,620 | Runge | Sept. 23, 1952 |
| 2,631,855 | Kornei | Mar. 17, 1953 |
| 2,680,025 | Goodwin | June 1, 1954 |
| 2,703,714 | Demby | Mar. 8, 1955 |
| 2,706,118 | Camras | Apr. 12, 1955 |
| 2,797,101 | Daniel | June 25, 1957 |
| 2,819,089 | Williams | Jan. 7, 1958 |